(12) United States Patent
Aida et al.

(10) Patent No.: US 7,030,788 B2
(45) Date of Patent: Apr. 18, 2006

(54) DATA RECORDING MEDIUM, DATA RECORDING METHOD, AND APPARATUS

(75) Inventors: Toru Aida, Kanagawa (JP); Toshihiko Senno, Kanagawa (JP)

(73) Assignee: Sony Disc & Digital Solutions Inc., Tokyo (JP)

( * ) Notice: Subject to any disclaimer, the term of this patent is extended or adjusted under 35 U.S.C. 154(b) by 66 days.

(21) Appl. No.: 10/479,717

(22) PCT Filed: Mar. 31, 2003

(86) PCT No.: PCT/JP03/04080

§ 371 (c)(1),
(2), (4) Date: Dec. 5, 2003

(87) PCT Pub. No.: WO03/085668

PCT Pub. Date: Oct. 16, 2003

(65) Prior Publication Data

US 2004/0151105 A1 Aug. 5, 2004

(30) Foreign Application Priority Data

Apr. 8, 2002 (JP) .............................. 2002-105278

(51) Int. Cl.
*H03M 7/00* (2006.01)
(52) U.S. Cl. .......................................... 341/59; 341/58
(58) Field of Classification Search ................ 341/58, 341/59, 50, 67, 65, 63
See application file for complete search history.

(56) References Cited

U.S. PATENT DOCUMENTS

| 6,118,104 A * | 9/2000 | Berkcan et al. ............. 219/494 |
| 2001/0004345 A1* | 6/2001 | Tanoue et al. ............ 369/59.25 |
| 2002/0159367 A1* | 10/2002 | Ahn ........................ 369/59.24 |
| 2005/0086578 A1* | 4/2005 | Saito et al. ................. 714/800 |
| 2005/0117491 A1* | 6/2005 | Sako et al. ............... 369/59.24 |

FOREIGN PATENT DOCUMENTS

| JP | 63-26855 | 2/1988 |
| JP | 9-288864 | 11/1997 |
| JP | 2002-216435 | 8/2002 |

* cited by examiner

*Primary Examiner*—Peguy JeanPierre
(74) *Attorney, Agent, or Firm*—Oblon, Spivak, McClelland, Maier & Neustadt, P.C.

(57) ABSTRACT

Output data of a multiplexer 11 is EFM-modulated by an EFM modulator 12. In the EFM modulation, merging bits that satisfy run length limit conditions Tmin=3 and Tmax=11 are selected. Among them, merging bits that converge DSV are selected. A run length controlling portion 13 detects a particular data pattern that causes DSV to increase as large as a data read error takes place and controls the EFM modulator 12 so that the run length limit conditions of the EFM are loosened. As a result, an increase of DSV is suppressed. Data is reproduced from a data recording medium on which the data has been recorded in such a manner and the reproduced data is decoded. The decoded data is re-encoded so as to record it to another recoding medium. When the data pattern is re-encoded, DSV increases. As a result, data cannot be correctly reproduced from the other recording medium. Consequently, a copying operation can be prevented.

18 Claims, 13 Drawing Sheets

Fig. 4

|     |     | DATA BITS |   |   |   |   |   |   |   | CHANNEL BITS |   |   |   |   |   |   |   |   |   |   |   |   |
| --- | --- | --- | --- | --- | --- | --- | --- | --- | --- | --- | --- | --- | --- | --- | --- | --- | --- | --- | --- | --- | --- | --- |
|     |     | d1 | . | . | . | . | . | . | d8 | d1 | . | . | . | . | . | . | . | . | . | . | . | . | c14 |
| 00  | 0   | 0 | 0 | 0 | 0 | 0 | 0 | 0 | 0 | 0 | 1 | 0 | 0 | 1 | 0 | 0 | 0 | 1 | 0 | 0 | 0 | 0 | 0 |
| 01  | 1   | 0 | 0 | 0 | 0 | 0 | 0 | 0 | 1 | 1 | 0 | 0 | 0 | 0 | 1 | 0 | 0 | 0 | 0 | 0 | 0 | 0 | 0 |
| 02  | 2   | 0 | 0 | 0 | 0 | 0 | 0 | 1 | 0 | 1 | 0 | 0 | 1 | 0 | 0 | 0 | 0 | 1 | 0 | 0 | 0 | 0 | 0 |
| 03  | 3   | 0 | 0 | 0 | 0 | 0 | 0 | 1 | 1 | 1 | 0 | 0 | 0 | 1 | 0 | 0 | 0 | 1 | 0 | 0 | 0 | 0 | 0 |
| 80  | 128 | 1 | 0 | 0 | 0 | 0 | 0 | 0 | 0 | 0 | 1 | 0 | 0 | 1 | 0 | 0 | 0 | 1 | 0 | 0 | 0 | 0 | 1 |
| 81  | 129 | 1 | 0 | 0 | 0 | 0 | 0 | 0 | 1 | 1 | 0 | 0 | 0 | 0 | 1 | 0 | 0 | 1 | 0 | 0 | 0 | 0 | 1 |
| 82  | 130 | 1 | 0 | 0 | 0 | 0 | 0 | 1 | 0 | 1 | 0 | 0 | 1 | 0 | 0 | 0 | 0 | 1 | 0 | 0 | 0 | 0 | 1 |
| 83  | 131 | 1 | 0 | 0 | 0 | 0 | 0 | 1 | 1 | 1 | 0 | 0 | 0 | 1 | 0 | 0 | 0 | 1 | 0 | 0 | 0 | 0 | 1 |
| 8C  | 140 | 1 | 0 | 0 | 0 | 1 | 1 | 0 | 0 | 0 | 1 | 0 | 0 | 0 | 0 | 0 | 1 | 0 | 0 | 0 | 0 | 0 | 1 |
| 98  | 152 | 1 | 0 | 0 | 1 | 1 | 0 | 0 | 0 | 0 | 1 | 0 | 0 | 1 | 0 | 0 | 0 | 0 | 0 | 0 | 0 | 0 | 1 |
| B8  | 184 | 1 | 0 | 1 | 1 | 1 | 0 | 0 | 0 | 0 | 1 | 0 | 0 | 1 | 0 | 0 | 0 | 0 | 0 | 1 | 0 | 0 | 1 |
| BA  | 186 | 1 | 0 | 1 | 1 | 1 | 0 | 1 | 0 | 1 | 0 | 0 | 1 | 0 | 0 | 0 | 0 | 0 | 1 | 0 | 0 | 0 | 1 |
| C9  | 201 | 1 | 0 | 1 | 1 | 1 | 0 | 0 | 0 | 1 | 0 | 0 | 0 | 0 | 1 | 0 | 0 | 0 | 0 | 0 | 0 | 0 | 1 |
| E2  | 226 | 1 | 0 | 1 | 1 | 1 | 0 | 1 | 0 | 1 | 0 | 0 | 0 | 0 | 1 | 0 | 0 | 0 | 1 | 0 | 0 | 1 | 0 |

Fig. 6

| | | | | | | | | | | | | | | | | | | | | |
|---|---|---|---|---|---|---|---|---|---|---|---|---|---|---|---|---|---|---|---|---|
| B8 | B8 | B8 | B8 | BA | B8 | B8 | BA | B8 | B8 | B8 | B8 | B8 | B8 | B8 | B8 | B8 | B8 | B8 | BA | B8 |
| B8 | B8 | B8 | B8 | BA | B8 | B8 | BA | B8 | B8 | B8 | B8 | B8 | B8 | B8 | B8 | B8 | B8 | B8 | BA | B8 |
| B8 | B8 | B8 | B8 | BA | B8 | B8 | BA | B8 | B8 | B8 | B8 | B8 | B8 | B8 | B8 | B8 | B8 | B8 | BA | BA |
| B8 | B8 | B8 | B8 | BA | B8 | B8 | BA | B8 | B8 | B8 | B8 | B8 | B8 | B8 | B8 | B8 | B8 | BA | BA | BA |
| B8 | B8 | B8 | BA | BA | B8 | B8 | BA | B8 | B8 | B8 | B8 | B8 | B8 | B8 | B8 | BA | BA | BA | BA | BA |
| B8 | B8 | BA | BA | BA | B8 | B8 | BA | B8 | B8 | B8 | B8 | B8 | B8 | BA | BA | BA | BA | BA | BA | BA |
| B8 | BA | BA | BA | BA | B8 | B8 | BA | B8 | B8 | B8 | B8 | B8 | BA | BA | BA | BA | BA | BA | BA | BA |
| BA | BA | BA | BA | BA | B8 | B8 | BA | B8 | B8 | B8 | B8 | BA | BA | BA | BA | BA | BA | BA | BA | BA |

Fig. 7

| | | | | | | | | | | | | | | | | | | | | |
|---|---|---|---|---|---|---|---|---|---|---|---|---|---|---|---|---|---|---|---|---|
| SY 81 | B8 | B8 | B8 | B8 | B8 | B8 | BA | B8 | BA B8 8C 98 B4 8B BA B8 BA BA B8 BA B8 B8 B8 C9 E2 83 81 |
| SY 81 | B8 | B8 | B8 | B8 | B8 | B8 | B8 | BA | BA BA B8 8C 98 B4 8B BA B8 BA BA B8 BA B8 B8 C9 E2 83 81 |
| SY 81 | B8 | B8 | B8 | B8 | B8 | B8 | B8 | BA | BA BA 8C AA B4 92 BA B8 BA B8 BA BA C9 E2 83 81 |
| SY 81 | B8 | B8 | B8 | B8 | B8 | B8 | B8 | BA | B8 BA AA AA AA BB 92 BA B8 BA B8 BA BA C9 E2 83 81 |
| SY 81 | B8 | B8 | B8 | B8 | B8 | B8 | B8 | B8 | BA BA AA AA AA BB 92 BA B8 BA B8 BA B8 BA C9 E2 83 81 |
| SY 81 | B8 | B8 | B8 | B8 | B8 | B8 | B8 | B8 | B8 B8 B8 AA 98 BB 8B BA B8 AA B8 BA B8 BA C9 E2 83 81 |
| SY 81 | B8 | B8 | B8 | B8 | B8 | B8 | BA | B8 | BA B8 8C 98 B4 8B BA B8 BA BA B8 BA BA B8 B8 C9 E2 83 81 |

| SY 81 | FB FA FB FA FB FA FB FA FB BA FB BB E2 A9 9A 70 | FB BB FB FA FB BA FB BA 6A AA D1 F1 |
|---|---|---|
| SY 81 | FB FA FB FA FB FA FB BA FB BB E2 A9 9A 70 | FB BB FB FA FB BA FB BA 6A AA D1 F1 |
| SY 81 | FB FA FB BB FB BB FB BA FB FA FB BB E2 81 9A B9 | FB BA FB BA FB BA FB BA 6A AA D1 F1 |
| SY 81 | FB FA FB BB FB BB FB BA FB FA FB BB 7A 81 E2 B9 | FB BA FB BA FB BA FB BA 6A AA D1 F1 |
| SY 81 | FB FA FB BB FB BB FB BA FB FA FB BB 7A 81 E2 B9 | FB BA FB BA FB BA FB BA 6A AA D1 F1 |
| SY 81 | FB FA FB BB FB BB FB BA FB FA FB BB 7A A9 E2 70 | FB BB FB FA FB FA FB BB 6A AA D1 F1 |
| SY 81 | FB FA FB FA FB FA FB BA FB BB E2 A9 9A 70 | FB BB FB FA FB FA FB BB 6A AA D1 F1 |
| SY 81 | FB FA FB FA FB FA FB BA FB BB E2 A9 9A 70 | FB BB FB FA FB FA FB BB 6A AA D1 F1 |

CONVENTIONAL ART

CONVENTIONAL ART

DATA RECORDING MEDIUM, DATA RECORDING METHOD, AND APPARATUS

TECHNICAL FIELD

The present invention relates to a data recording apparatus, a data recording method, and an apparatus thereof that are applicable to for example a read-only memory (ROM) type optical disc.

BACKGROUND ART

Since optical discs such as a CD (Compact Disc) and a CD-ROM (Compact Disc Read Only Memory) are easy to handle and are produced at relatively low cost, they have been widely used as recording mediums for storing data. In recent years, a CD-R (Compact Disc Recordable) disc, on which data can be recorded once, and a CD-RW (Compact Disc ReWritable) disc, on which data can be rewritten, have come out. Thus, data can be easily recorded on such recordable optical discs. As a result, optical discs that accord with the CD standard such as a CD-DA (Digital Audio) disc, a CD-ROM disc, a CD-R disc, and a CD-RW disc have become the mainstream of data recording mediums. In addition, in recent years, audio data is compressed according to the MP3 (MPEG1 Audio Layer-3) and the ATRAC (Adaptive TRansform Acoustic Coding) 3 and recorded on the CD-ROM disc, the CD-R disc, the CD-RW disc, and so forth.

However, as a CD-R disc and a CD-RW disc have come out, data recoded on a CD disc can be easily copied to those discs. As a result, a problem about copyright protection has arisen. Thus, when content data is recorded to a recordable optical disc, it is necessary to take measures to protect content data.

FIG. 12 shows an outline of a flow of a copying process. A reproducing apparatus denoted by reference numeral 41 reproduces data from an original disc, for example a CD 42. Reference numeral 43 represents an optical pickup. Reference numeral 44 represents a reproduction signal processing portion. Reproduced signal is supplied from the reproducing apparatus 41 to a recording process portion 52 of a recording portion 51. An optical pickup 53 records the reproduced data to an optical disc, for example a CD-R 54. The recorded contents of the original CD 42 are recorded to the CD-R 54. Using the reproducing apparatus 41 and the recording portion 51, a copied disc of the original CD 42 can be easily produced.

In the case of a CD, as shown in FIG. 13, a sync detecting portion 46 of the reproducing process portion 44 detects a frame sync from a reproduced signal supplied from an input terminal 45. An EFM demodulator 46 EFM-demodulates the reproduced signal and supplies the EFM-demodulated reproduced data to a CIRC (Cross Interleave Reed-Solomon Code) decoder 48. The CIRC decoder 48 corrects an error of the reproduced signal. The EFM converts each symbol (eight data bits) into 14-channel bits and adds merging bits of three bits between adjacent blocks of 14 channel bits. A sub code decoder 49 decodes the reproduced data and obtains a reproduced sub code.

FIG. 14 shows an outlined structure of a recording process portion 52. Data to be recorded is supplied from an input terminal 55 to a CIRC encoder 56. The CIRC encoder 56 performs a CIRC encoding process for the data supplied from the input terminal 55. In addition, a sub code is supplied from an input terminal 57 to a sub code encoder 58. The sub code encoder 58 formats the sub code. An output of the CIRC encoder 56 and an output of the sub code encoder 58 are supplied to a multiplexer 60. In addition, a frame sync is supplied from an input terminal 59 to the multiplexer 60. The multiplexer 60 arranges those data in a predetermined order. An output of the multiplexer 60 is supplied to an EFM modulator 61. The EFM modulator 61 performs an EFM modulating process for data that is output from the multiplexer 60.

As one method for protecting content data recorded on a CD disc, it is determined whether the loaded disc is an original CD or a copied CD thereof. When the loaded disc is an original CD, a copying operation thereof can be permitted. When the loaded disc is a copied disc, a further copying operation thereof can be prohibited.

To determine whether the loaded disc is an original disc or a copied disc, a method for inserting a defect onto a disc during a master disc production, detecting the defect from a disc during a reproduction, and determining whether the disc is an original disc depending on whether or not the defect has been detected has been proposed. In this method, however, an original disc may contain a defect. In addition, depending on the type of a defect, it can be copied as it is. As a result, content data of an original disc cannot be prevented from being copied to a CD-R.

DISCLOSURE OF THE INVENTION

An object of the present invention is to provide a data recording medium, a data recording method, and an apparatus thereof that allow a determination of whether a loaded disc is an original disc or a copied disc to be made and a copying operation to be prevented from being performed without need to intentionally insert a defect.

To solve the foregoing problem, the present invention is a data recording medium on which digital data is recorded using a digital modulating system for converting a data symbol of a predetermined number of bits into a code symbol of a larger number of bits than the data symbol and generating record data whose run length is restricted, wherein in the state that the run length is restricted, a data pattern that causes an absolute value of DSV (Digital Sum Variation) to increase as large as data is prevented from being normally reproduced is recorded to a part of the data recording medium and data selected in the state that a run length restriction condition is loosened is recorded in the data pattern. A more practical mode of the present invention is the data recording medium wherein a plurality of merging bits are disposed at a boundary of adjacent code symbols, wherein as the merging bits, there are a plurality of bit patterns, wherein when the data pattern is not detected, a bit pattern that satisfies the run length restriction condition is selected from the plurality of bit patterns as the merging bits, and wherein when the data pattern is detected, in the state that the run length restriction condition is loosened, the selected bit pattern is recorded as the merging bits.

The present invention is a data recording method on which digital data is recorded using a digital modulating system for converting a data symbol of a predetermined number of bits into a code symbol of a larger number of bits than the data symbol and generating record data whose run length is restricted, the data recording method comprising the steps of: in the state that the run length is restricted, recording a data pattern that causes an absolute value of DSV to increase as large as data is prevented from being normally reproduced to a part of the data recording method; and recording data selected in the state that a run length restriction condition is loosened in the data pattern. A more practical mode of the present invention is the data recording method, wherein a plurality of merging bits are disposed at a boundary of adjacent code symbols, wherein as the merging bits, there are a plurality of bit patterns, wherein when the data pattern is not detected, a bit pattern that satisfies the run length restriction condition and that causes DSV to maximally decrease is selected from the plurality of bit patterns as the merging bits, and wherein when the data pattern is detected, in the state that the run length restriction condition is loosened, the selected bit pattern is recorded as the merging bits.

The present invention is a data recording apparatus for recording digital data using a digital modulating system for converting a data symbol of a predetermined number of bits into a code symbol of a larger number of bits than the data symbol and generating record data whose run length is restricted, wherein in the state that the run length is restricted, a data pattern that causes an absolute value of DSV to increase as large as data is prevented from being normally reproduced is partly,recorded, and wherein data selected in the state that a run length restriction condition is loosened is recorded in the data pattern. A more practical mode of the present invention is the data recording apparatus, wherein a plurality of merging bits are disposed at a boundary of adjacent code symbols, wherein as the merging bits, there are a plurality of bit patterns, wherein when the data pattern is not detected, a bit pattern that satisfies the run length restriction condition and that causes DSV to maximally decrease is selected from the plurality of bit patterns as the merging bits, and wherein when the data pattern is detected, in the state that the run length restriction condition is loosened, the selected bit pattern is recorded as the merging bits.

According to the present invention, in the state that the run length is restricted, a data pattern that causes the absolute value of DSV to increase as large as data is prevented from being normally reproduced is partly recorded. Thus, a data pattern cannot be correctly reproduced from a data recording medium on which data has been recorded using a conventional encoder. In contrast, an encoder according to the present invention records a selected data pattern in the state that a run length restriction condition is loosened. Thus, an increase of the absolute value of DSV can be suppressed. As a result, a data pattern can be correctly reproduced. Consequently, depending on whether or not the data pattern can be reproduced, it can be determined whether the loaded medium is an original medium or a copied medium.

BRIEF DESCRIPTION OF THE DRAWINGS

FIG. 4 is a schematic diagram showing a part of an EFM conversion table.

FIG. 6 is a schematic diagram showing an example of a particular data pattern for use with the present invention.

FIG. 7 is a schematic diagram showing data of which an example of a particular data pattern is CIRC-encoded and a frame synchronous signal and a sub code are added thereto.

FIG. 10 is a schematic diagram showing another example of a particular data pattern for use with the present invention.

FIG. 11 is a schematic diagram showing data of which the other example of the particular data pattern is CIRC-encoded and a frame synchronous signal and a sub code are added thereto.

BEST MODES FOR CARRYING OUT THE INVENTION

Figure 1:
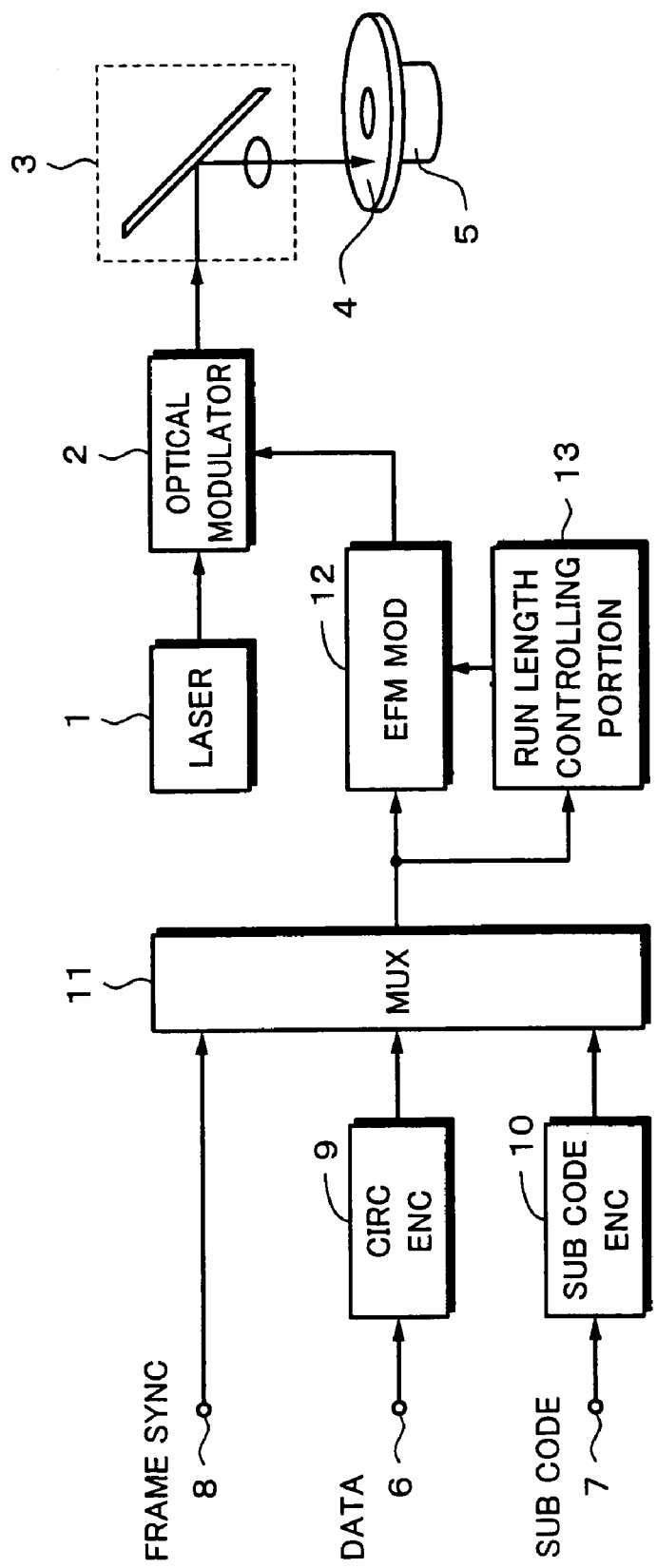
FIG. 1 is a block diagram showing an example of the structure of a mastering apparatus according to an embodiment of the present invention.

Next, an embodiment of the present invention will be described. FIG. 1 shows an example of the structure of a mastering apparatus that produces a data recording medium according to the present invention. The mastering apparatus has a laser 1 that is a gas laser (for example, an Ar laser, an He—Cd laser, or a Kr laser) or a semiconductor laser, an acoustooptic effect type or electrooptic type optical modulator 2 that modulates laser light emitted from the laser 1, and an optical pickup 3 that is a recording means having an objective lens that collects laser light that has passed through the optical modulator 2 and radiates the collected light to a photoresist surface of a disc shaped glass master disc 4 on which photoresist, which is a photosensitive material, has been coated.

The optical modulator 2 modulates the laser light emitted from the laser 1 corresponding to a record signal.

The mastering apparatus radiates the modulated laser light to the glass master disc 4. As a result, a maser on which data has been recorded is produced. In addition, a servo portion (not shown) is disposed. The servo portion controls the distance between the optical pickup 3 and the glass master disc 4 constant, tracking, and a rotation driving operation of a spindle motor 5. The rotations of the glass master disc 4 are driven by the spindle motor 5.

The record signal is supplied from an EFM modulator 12 to the optical modulator 2. Main digital data to be recorded is supplied from an input terminal 6. The main digital data is for example two-channel stereo digital audio data. A sub code of channels P to W according to the current CD standard is supplied from an input terminal 7. In addition, a frame sync is supplied from an input terminal 8.

The main digital data is supplied to a CIRC encoder 9. The CIRC encoder 9 performs an error correction code encoding process for adding parity data or the like for correcting an error and a scrambling process for the main digital data. In other words, one sample or one word of 16 bits is divided into two symbols of high order eight bits and low order eight bits. The error correction code encoding process for adding parity data or the like for correcting an error with for example CIRC and the scrambling process are performed for each symbol. A sub code encoder 10 converts the sub code that has been input from the input terminal 7 into a sub code having an EFM frame format.

An output of the CIRC encoder 9, an output of the sub code encoder 10, and a frame sync are supplied to a multiplexer 11. The multiplexer 11 arranges them in a predetermined order. Output data of the multiplexer 11 is supplied to the EFM modulator 12. The EFM modulator 12 converts a symbol of eight bits into data of 14 channel bits according to a conversion table. In addition, an output of the multiplexer 11 is supplied to a run length controlling portion 13. The run length controlling portion 13 controls a run length of the EFM modulated output of the EFM modulator 12. An output of the EFM modulator 12 is supplied to the optical modulator 2.

The EFM modulating 12 generates a record signal in the CD EFM frame format. The record signal is supplied to the optical modulator 2. With a modulated laser beam that is output from the optical modulator 2, the photoresist on the glass master disc 4 is exposed. A developing process and an electroplating process are performed for the glass master disc 4 on which data has been recorded in such a manner. As a result, a metal master is produced. With the metal master, a mother disc is produced. With the mother disc, a stamper is produced. With the stamper, an optical disc is produced by the compression molding method, the injection molding method, or the like.

Figure 2:
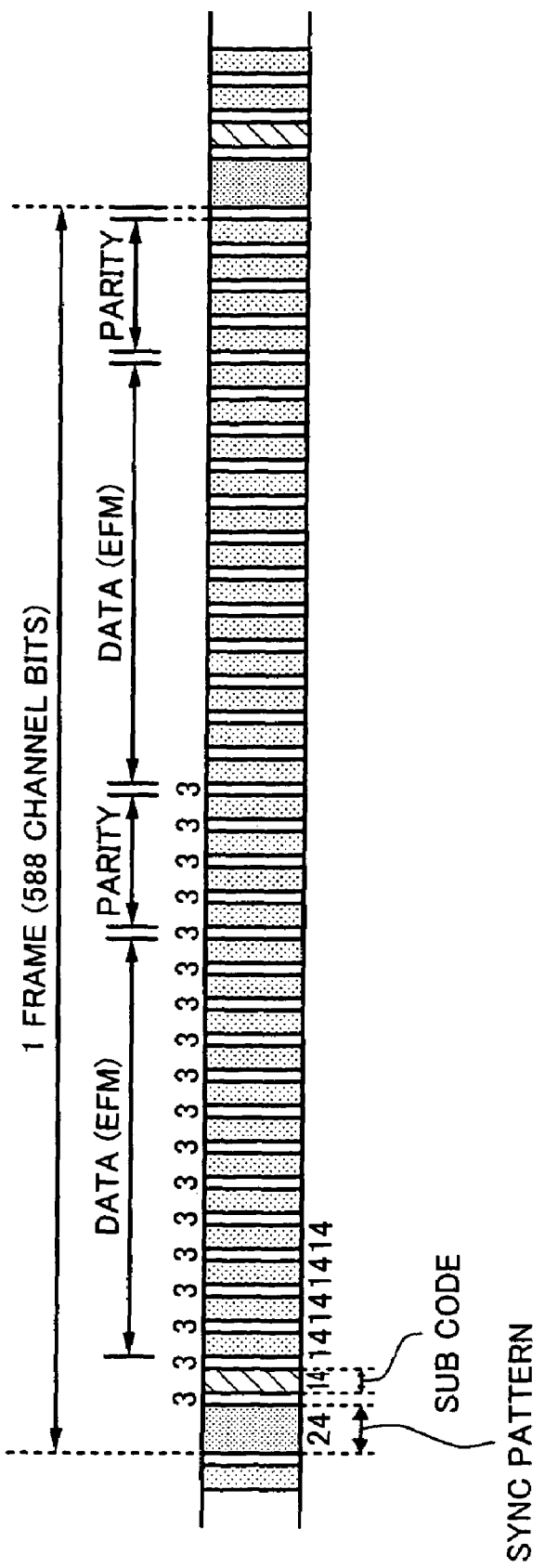
FIG. 2 is a schematic diagram describing an EFM frame format of a CD.

FIG. 2 shows the data structure of one EFM frame of a CD. In a CD, parity Q and parity P which are four symbols each are made from a total of 12 sample words (24 symbols) of digital audio data of two channels. 33 symbols (264 data bits) of which one symbol of a sub code is added to a total of 32 symbols is treated as one block. In other words, one frame which has been EFM-modulated contains a sub code of one symbol, data of 24 symbols, a Q parity of four symbols, and a P parity of four symbols.

In the EFM modulating system, each symbol (eight data bits) is converted into 14 channel bits. The minimum time length of the EFM modulation (namely, the time length of which the number of 0s between two 1s of a record signal becomes the minimum) Tmin is 3T. The bit length equivalent to 3T is 0.87 μm. The bit length equivalent to T is the shortest bit length. Merging bits (also referred to as connection bits) of three bits is disposed between two blocks of 14 channel bits. In addition, a frame sync pattern is added at the beginning of a frame. When the period of a channel bit is T, a frame sync pattern is a pattern of 11T, 11T, and 2T that are successive. Since such a pattern does not take place according to the EFM conversion rule, a frame sync can be detected with a special pattern. The total number of bits of one EFM frame is 588 channel bits. The frame frequency is 7.35 kHz.

A group of 98 EFM frames is referred to as sub code frame (or sub code frame). A sub code frame of which 98 frames are successively re-arranged in the vertical direction is composed of a frame synchronous portion that identifies the beginning of the sub code frame, a sub code portion, data, and a parity portion. A sub code frame is equivalent to 1/75 second of a reproduction time of a conventional CD.

The sub code portion is composed of 98 EFM frames. Two frames at the beginning of the sub code portion are a synchronous pattern of the sub code frame and a pattern of an EFM out-of-rule. The individual bits of the sub code portion compose P, Q, R, S, T, U, V, and W channels.

The R channel to W channel are used for a special purpose such as a still picture or a sub-title display of so-called Karaoke. The P channel and Q channel are used for a track position controlling operation for the pickup during reproduction of digital data recorded on the disc.

The P channel is used to record a signal whose level is "0" in a so-called lead-in area, which is an inner peripheral portion of the disc and a signal whose levels are "0s" and "1s" repeated at predetermined periods in a so-called lead-out area, which is an outer peripheral portion of the disc. The P channel is also used to record a signal whose level is "1" between music programs in a program area between the lead-in area and the lead-out area of the disc and a signal whose level is "0" in the other area. The P channel is used to detect the beginning of each music program during reproduction of digital audio data recorded on the CD.

The Q channel is provided to more acutely control digital audio data recorded on the CD during reproduction. One sub code frame of the Q channel is composed of a synchronous bit portion, a control bit portion, an address bit portion, a data bit portion, and a CRC bit portion.

Figure 3:
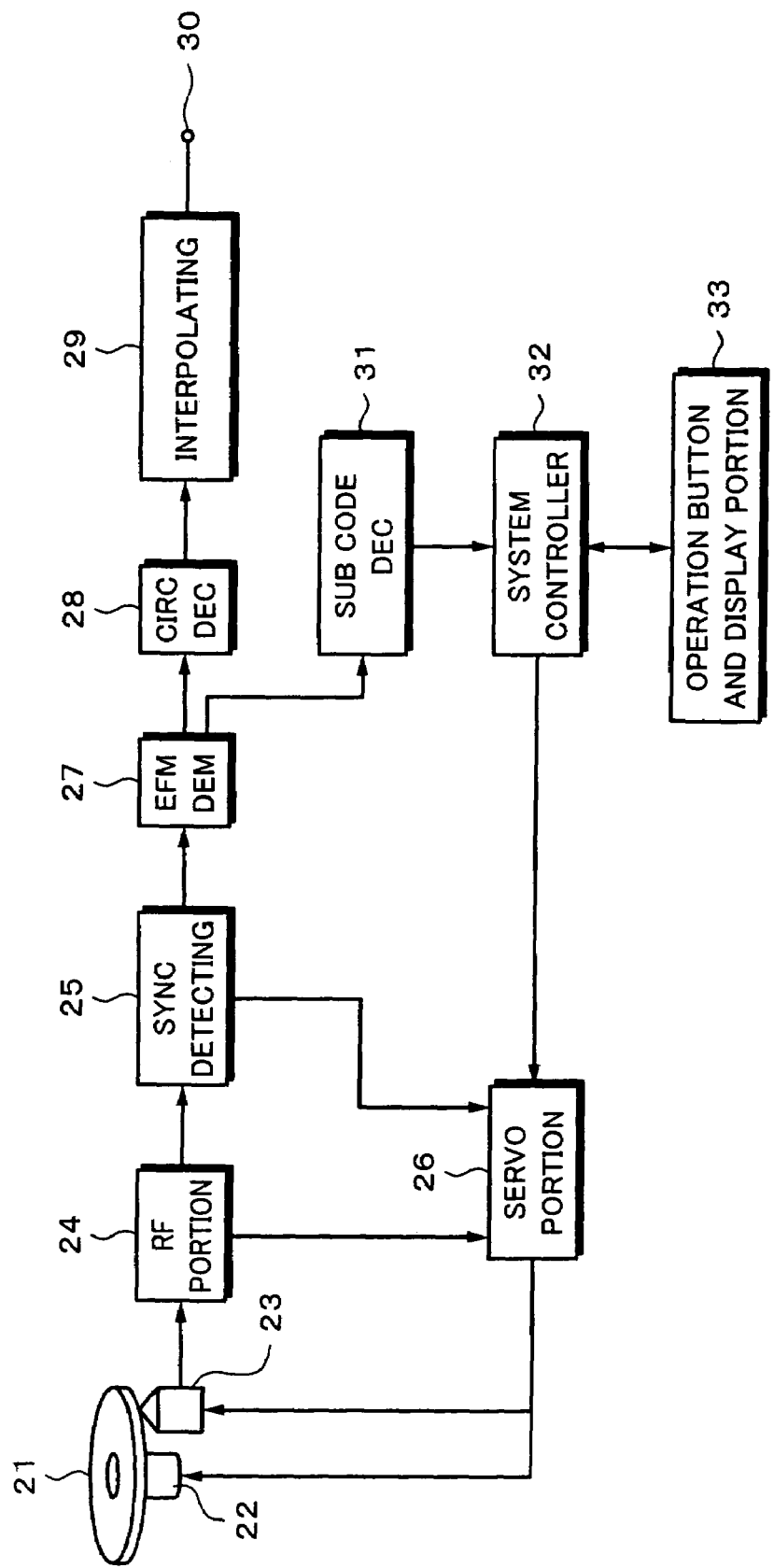
FIG. 3 is a block diagram showing the structure of a CD reproducing apparatus.

FIG. 3 shows an example of the structure of a reproducing apparatus that reproduces data from an optical disc that has been produced in the foregoing mastering and stamping processes. Although the structure of the reproducing apparatus shown in FIG. 3 is the same as that of a conventional player or drive, the structure will be described for easy understanding of the present invention. In FIG. 3, reference numeral 21 represents a disc produced in the mastering and stamping processes. Reference numeral 22 represents a spindle motor that drives the rotations of the disc 21. Reference numeral 23 represents an optical pickup that reproduces a signal recorded on the disc 21. The optical pickup 23 is composed of an optical system such as a semiconductor laser that radiates laser light to the disc 21 and an objective lens, a detector that receives light reflected from the disc 21, a focus and tracking mechanism, and so forth. In addition, the optical pickup 23 is traveled in the radius direction of the disc 21 by a thread mechanism (not shown).

Output signals of for example a four-divided detector of the optical pickup 23 are supplied to an RF portion 24. The RF portion 24 calculates the output signals of the individual detector elements of the four-divided detector and generates a reproduction signal (RF) signal, a focus error signal, and a tracking error signal. The reproduction signal is supplied to a sync detecting portion 25. The sync detecting portion 25 detects a frame sync from the beginning of each EFM frame. The detected frame sync, the focus error signal, and the tracking error signal are supplied to a servo portion 26. The servo portion 26 controls rotations of the spindle motor 22 and a focus servo and a tracking servo of the optical pickup 23 corresponding to a reproduced clock of the RF signal.

Main data that is output from the sync detecting portion 25 is supplied to an EFM demodulator 27. The EFM demodulator 27 performs an EFM demodulating process for the main data. Main digital data is supplied from the EFM demodulator 27 to a CIRC decoder 28. The CIRC decoder 28 performs an error correcting process for the main digital data. In addition, an interpolating circuit 29 interpolates the main digital data and outputs the resultant data as reproduced data to an output terminal 30. Sub code data is supplied from the EFM demodulator 27 to a system controller 32.

The system controller 32 is composed of a microcomputer. The system controller 32 controls operations of the whole reproducing apparatus. In association with the system controller 32, an operation button and display portion 33 is disposed. The system controller 32 controls the servo portion 26 so as to access a desired position of the digital 21.

FIG. 4 shows a part of a conversion table that represents a rule for which data bits of eight bits (sometimes referred to as data symbol) of the EFM modulator 12 are converted into channel bits of 14 bits (sometimes referred to as code symbol). In FIG. 4, data bits are represented in hexadecimal notation (00 to FF), decimal notation (0 to 255), and binary notation. "1" of a code symbol of 14 bits represents a position at which a value is inverted. Since one data symbol is composed of eight bits, there are 256 patterns thereof. All code symbols of 14 bits satisfy an EFM rule of which the minimum time length (time length in which the number of 0s between two is of a record signal becomes the minimum) Tmin is 3T and the maximum time length (time length in which the number of 0s between two 1s of a record signal becomes the maximal) Tmax is 11T (hereinafter sometimes referred to as run length limit conditions).

When code symbols 14 bits each are connected, merging bits are required to satisfy the foregoing run length limit conditions Tmin=3T and Tmax=11T. There are four types of patters (000), (001), (010), and (100) as merging bits. Next, an example of which merging bits are used to connect code symbols 14 bits each will be described with reference to FIG. 5A to FIG. 5D. The following example is described in "Book on Compact Disc (Version 3) [translated title; written in Japanese]", published by Ohm Publishing Company, Japan, Mar. 25, 2001.

Figures 5A, 5B, 5C, 5D:
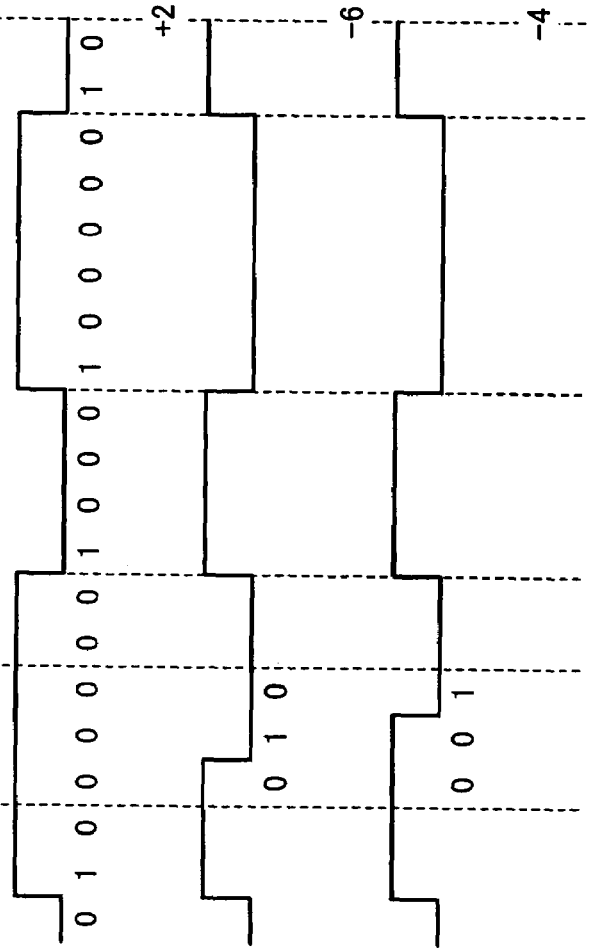
FIG. 5A to FIG. 5D are schematic diagrams describing a merging bit selecting method.

As shown in FIG. 5A, now the cast that the preceding pattern of 14 bits ends with (010) and that the next data symbol is (01110111) (77 in hexadecimal notation and 119 in decimal notation) will be considered. The data symbol is converted into a pattern of 14 bits (00100010000010). Before timing $t_0$, the preceding pattern of 14 bits ends. At timing $t_1$, after the period of merging bits, the next pattern of 14 bits starts. At timing $t_2$, the next pattern of 14 bits ends.

As to the foregoing four types of merging bits, when (100) are applied, since the condition Tmin=3t is not satisfied. Thus, those merging bits cannot be used. However, the other three types of merging bits can be used. As merging bits actually used of the three types of merging bits, one type that decreases the absolute value of DSV (hereinafter the notation of the absolute value is omitted) is selected. DSV is obtained in such a manner that when a waveform is in a high level, +1 is added and that when a waveform is in a low level, −1 is added. As an example, it is assumed that DSV at timing $t_0$ is (−3).

FIG. 5B shows a waveform in the case that (000) are used as merging bits. DSV in period ($t_0$−$t_1$) is +3. DSV in period ($t_1$−$t_2$) is +2. Thus, DSV at timing $t_2$ is (−3+3+2=+2). FIG. 5C shows a waveform in the case that (010) are used as merging bits. DSV in period ($t_0$−$t_1$) is −1. DSV in period ($t_1$−$t_2$) is − 2. Thus, DSV at timing $t_2$ is (−3−1−2=−6). FIG. 5D shows a waveform in the case that (001) are used as merging bits. DSV in period ($t_0$−$t_1$) is +1. DSV in period ($t_1$−$t_2$) is −2. Thus, DSV at timing $t_2$ is (−3+1−2=−4). After all, merging bits (000) of which DSV at timing $t_2$ is the closest to 0 are selected.

A merging bit selecting portion is disposed in the EFM modulator 12 (see FIG. 1). As described above, the merging bit selecting portion selects merging bits that satisfy Tmin=3 and Tmax=11, which are run-length limit conditions of the EFM modulation. Among these types of merging bits, the merging bit selecting portion selects one type that converges DSV. According to the present embodiment of the present invention, the run length controlling portion 13 EFM-modulates a data pattern without increasing DSV even if a conventional EFM modulator causes the data pattern to increase DSV and result in a data read error. In other words, the run length controlling portion 13 detects the case that DSV increases and results in a data read error and controls the merging bit selecting portion of the EFM modulator 12 so that the EFM run length limit conditions loosen. For example, Tmin=3 and Tmax=11 are loosened to Tmin'=2 and Tmax'=12, respectively. Alternatively, either Tmin or Tmax of the run length limit conditions may be changed. Alternatively, the run length limit conditions may be Tmin'=1 and Tmax' =13.

To describe the function of the run length controlling portion 13, a particular data pattern shown in FIG. 6 will be considered. A particular data pattern is a pattern that causes DSV to increase as large as data is prevented from being normally reproduced arises. In FIG. 6, individual data symbols (eight bits each) are denoted in hexadecimal notation. FIG. 6 shows 24 symbols×8=192 symbols. In FIG. 6, the horizontal direction represents the time axis direction. The last data symbol of 24 symbols of one line is followed by the first data symbol of 24 symbols of the next line. In the case of audio data, adjacent two symbols correspond to one sample (16 bits) and adjacent four symbols correspond to stereo audio data (L and R). Thus, one line contains 12 samples. 12 samples are arranged in one EFM frame of the CD shown in FIG. 2.

In the structure shown in FIG. 1, data shown in FIG. 6 is input to the input terminal 6. The CIRC encoder 9 performs an encoding process with Reed-Solomon code and an interleaving process for the data that has been input from the input terminal 6. Output data of the CIRC encoder 9 is input to the multiplexer 11. The multiplexer 11 adds a sub code and a frame sync to the data that has been output from the CIRC encoder 9. From the multiplexer 11, data shown in FIG. 7 is obtained. One line corresponds to one EFM frame (see FIG. 2). In FIG. 7, SY represents a frame synchronous signal. The next data symbol (81) corresponds to a sub code. Since the interleaving process has been performed for the data shown in FIG. 7, its arrangement is different from that shown in FIG. 6. The data shown in FIG. 7 is EFM-modulated by the EFM modulator 12.

Figure 8:
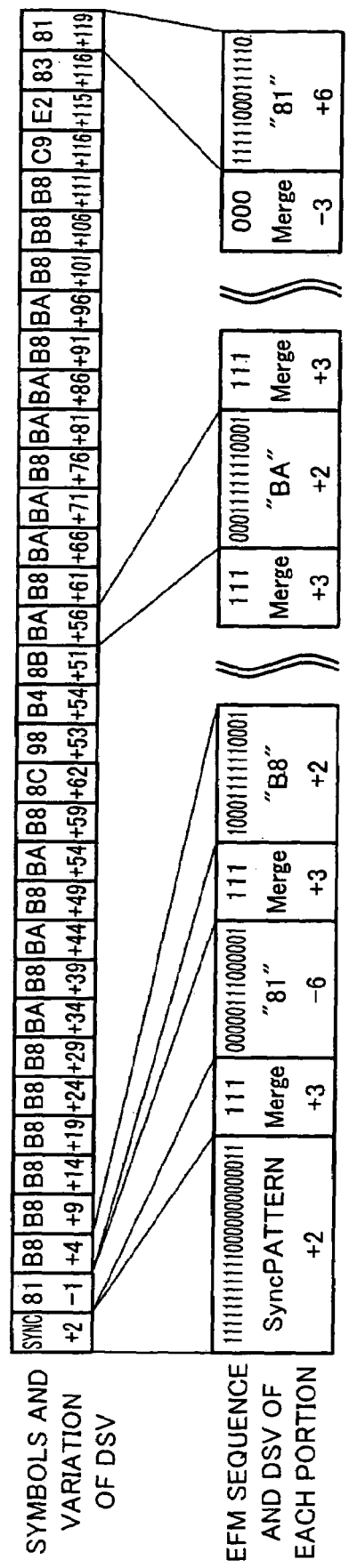
FIG. 8 is a schematic diagram showing DSV in the case that data shown in FIG. 7 is EFM-modulated by a conventional method and a part of a waveform thereof.

The data pattern shown in FIG. 7 contains data symbols (81), (83), (8C), (98), (B8), (BA), (C9), (E2), and so forth. The beginning portion of each code symbol of 14 bits that has been converted according to the EFM conversion table (see FIG. 4) is 0T (that represents that the level immediately varies) or 1T (that represents that the level varies after 1T), whereas the end portion thereof is only 1T. FIG. 8 shows the variation of DSV in the case that data of the first line of FIG. 7 has been EFM-modulated and a part of the EFM sequence. In FIG. 8, to represent a waveform of an EFM sequence, "1" and "0" represent a high level and a low level, respectively.

Next, FIG. 8 will be described in more details. A frame synchronous signal is composed of a waveform of 11T, an inverted waveform of 11T, and a waveform of 2T. In the portion of the frame synchronous signal, DSV=+2. A data symbol (81) corresponding to a sub code is converted into a code symbol (10000100100001) according to the conversion table shown in FIG. 4. The level of the code symbol (81) varies at the beginning. DSV of the code symbol (81) is −6. According to the conventional merging bit selection rule, (000) are selected as merging bits that satisfy the run length limit condition. In other words, the other merging bits (100), (010), and (001) do not satisfy Tmin=3T. Thus, as merging bits, (000) are unconditionally selected. As a result, a level inversion does not take place at the portion of the merging bits. DSV of the merging bits is +3. DSV at the end of the code symbol of which the data symbol (81) has been converted is +2+3−6=−1.

The next data symbol (B8) is converted into a code symbol (01001000001001) according to the conversion table shown in FIG. 4. DSV of the code symbol (01001000001001) is +2. As merging bits that satisfy the run length limit condition, (000) are unconditionally selected. As a result, a level inversion does not take place at the portion of the merging bits. DSV of the merging bits is +3. DSV at the end of code symbol of which the data symbol (B8) has been converted is +2+3−6+3+2=+4.

The data symbol (BA) is converted into a code symbol (10010000001001) according to the conversion table shown in FIG. 4. DSV of the code symbol (10010000001001) is +2. As merging bits that satisfy the run length limit condition, (000) are unconditionally selected according to the conventional merging bit selection rule. As a result, a level inversion does not take place at the portion of the merging bits. DSV of the merging bits is +3.

Thus, in the foregoing particular data pattern, there is no room for selecting merging bits. As a result, the function for converging DSV does not work. As shown in FIG. 8, in one EFM frame, DSV increases by more than 100. As long as the data pattern continues, DSV increases. After the data pattern has ended, when random data takes place, merging bits are controlled so that the increased DSV is converted to 0. As a result, DSV abruptly decreases.

In a CD that is produced with a record signal encoded with the foregoing particular data pattern, since DSV remarkably increases, original data cannot be correctly read. In reality, an asymmetry compensation and so forth of the reproducing circuit are adversely affected. As a result, data cannot be correctly read from the CD. Alternatively, since data is incorrectly corrected, errors increase. Thus, whenever data is read from a particular region, the read value varies. This means that when data is read from an original CD, the reproduced data is encoded by a conventional encoder, and the encoded data is recorded to a medium such as a CD-R, reproduced data of the medium cannot be correctly read. As a result, the copying operation can be prevented.

In addition, whether or not contents other than the particular data pattern portion is used can be controlled. In other words, from a disc produced using the encoder according to the present invention, the relevant data pattern portion can be reproduced. In contrast, from a disc that has been produced using a conventional encoder using an original disc, the relevant data pattern portion cannot be reproduced. Thus, depending whether or not the data pattern portion can be read, the loaded disc is detected as an original disc or a copied disc. Corresponding to the detected result, with the determination of whether or not recorded contents other than the data pattern portion can be used, contents of a copied disc can be prevented from being used.

From a view point for preventing contents from being copied, a data pattern of the foregoing 192 symbols is repeatedly recorded in the program area of the disc N times (where N is any positive integer, which is one or larger). As described above, when the determination of whether the loaded disc is an original disc or a copied disc is made depending on whether or not the data pattern portion can be reproduced, it is preferred that the record position of the data pattern portion should be pre-defined. Likewise, as to a CD-ROM, with a particular data pattern recorded thereon, contents can be prevented from being copied therefrom.

According to the present embodiment of the present invention, as shown in FIG. 1, the run length controlling portion 13 is disposed. The run length controlling portion 13 pre-reads data that has been EFM-modulated and detects a particular data pattern (see FIG. 6) of which the conventional EFM modulation cannot suppress the divergence of DSV. Alternatively, without pre-reading the data that has been EFM-modulated, the run length controlling portion 13 may detect DSV of the EFM-modulated output. The particular data pattern can be detected by a pattern mapping method for detecting a particular data pattern, a method for comparing an absolute value of DSV with a threshold value and detecting an occurrence of which an absolute value exceeds a threshold value, a method for detecting an occurrence of which an absolute value of DSV exceeds a threshold value in a predetermined number of symbols, and so forth. When the run length controlling portion 13 does not detect a particular data pattern, the run length controlling portion 13 controls the EFM modulator 12 so that it selects merging bits that satisfy the run length limit conditions Tmin=3T and Tmax=11T. When the run length controlling portion 13 has detected the particular data pattern, the run length controlling portion 13 loosens the run length limit conditions for example Tmin'=2T and Tmax'=12T. Thus, there is a room for selecting merging bits. As a result, merging bits that cause DSV to decrease can be selected.

Figure 9:
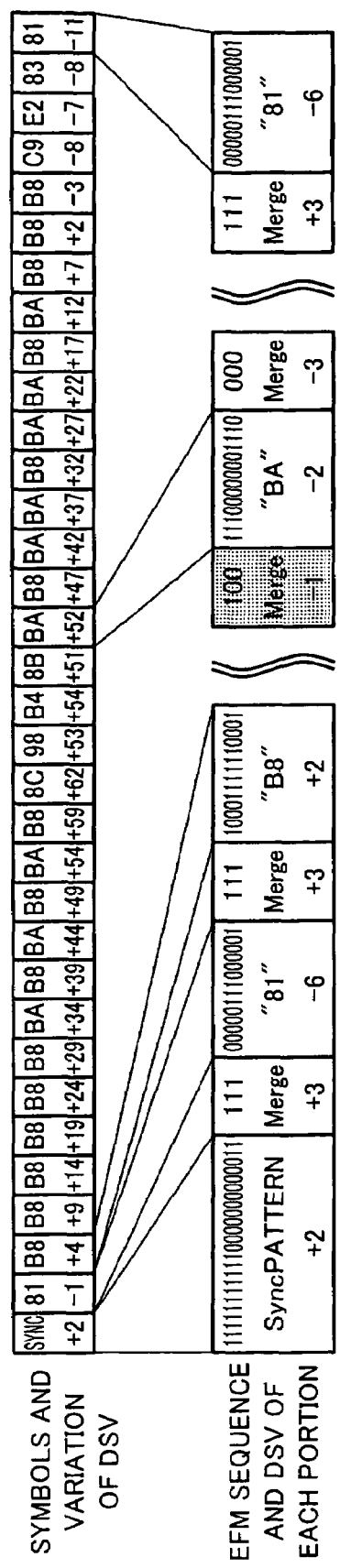
FIG. 9 is a schematic diagram showing DSV in the case that data shown in FIG. 7 is EFM-modulated by a method according to the present invention and a part of a waveform thereof.
Figure 12:
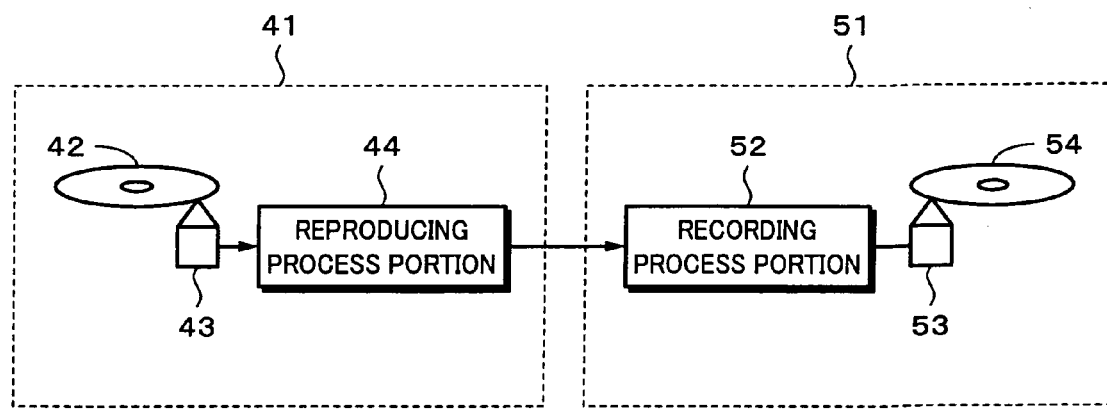
FIG. 12 is a block diagram describing a flow of a copying process for a disc.
Figure 13:
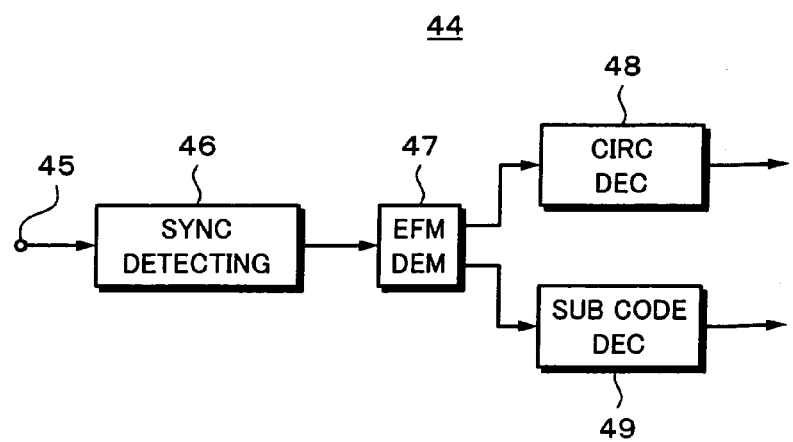
FIG. 13 is a block diagram showing an outline of a conventional reproducing process portion.
Figure 14:
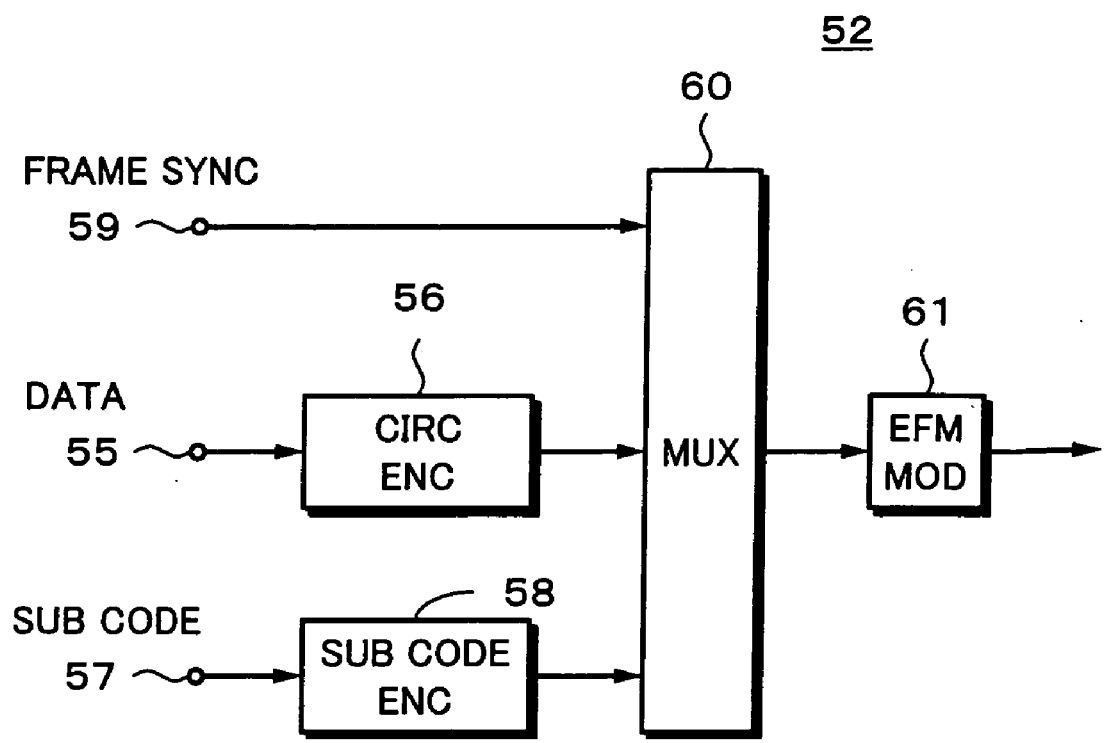
FIG. 14 is a block diagram showing an outline of a conventional recording process portion.

Like FIG. 8, FIG. 9 shows the variation of DSV in the case that data of the first line of FIG. 7 has been EFM-modulated and a part of an EFM sequence. As an example, it is assumed that when the data symbol is (BA), the run length limit conditions are the same as those of the conventional EFM modulation, and DSV is +56, a-particular data pattern is detected. In this case, as described with reference to FIG. 8, a level inversion takes place at the end of the code symbol (8B) of 14 bits. Thus, there is only 1T. In addition, a level inversion takes place at the beginning of the next code symbol (BA). Thus, only (000) can be selected as merging bits. As a result, DSV cannot be decreased. According to the present embodiment, since Tmin'=2T, not only (000), but (010) can be selected as merging bits. In other words, in this case, in a total of four channel bits of the last channel bit of the preceding code symbol (8B) and the merging bits, a waveform of 2T (denoted by 11) and a waveform of 2T (denoted by 00) take place.

When (010) are selected as merging bits, a level inversion takes place in the merging bits unlike merging bits (000). Thus, the polarities of code symbols after the next code symbol (BA) are inverted from those shown in FIG. 8. As a result, even if the run length limit conditions are restored to the original conditions, as shown in FIG. 9, DSV can be controlled so that it converges to 0. Even if DSV diverges in the minus direction (not shown), when the run length limit conditions are loosened, DSV can be converged.

When the foregoing particular data pattern is successively input, only with substitution of merging bits in the foregoing manner, a small increase or a small decrease of DSV may not be suppressed. However, such a small increase or such a small decrease of DSV does not largely affect reproduction of a CD. In the case that the EFM modulator 12 has stored DSV, after the particular data pattern has ended, in the state that merging bits can be controlled, there is a possibility of which an operation that causes DSV to be returned to 0 is performed. As a result, DSV abruptly varies. This situation is not suitable for reproduction of data.

To suppress an abrupt variation of DSV, when merging bits are restored to the state that they can be selected, the run length controlling portion 13 outputs a command that causes DSV stored in the EFM modulator 12 to be cleared to 0. As a result, after DSV cumulatively varies with the particular data pattern, the operation that causes DSV to converge to around 0 is not performed. Consequently, an abrupt variation of DSV can be suppressed.

FIG. 10 shows another example of the particular data pattern. In the other example, data symbols (BB), (FA), (FB), and so forth are used. These data symbols are converted into their 14-bit symbol codes (BB)= (10001000001001), (FA)=(10010000010010), and (FB)= (10001000010010).

In FIG. 11, the data shown in FIG. 10 is encoded by a CIRC encoder and a frame synchronous signal and a sub code are added to the encoded data. Each line corresponds to data of one EFM frame. The data shown in FIG. 11 is EFM-modulated. Likewise, as to another data pattern, when a conventional encoder is used, DSV increases. In contrast, when an encoder according to the present invention is used, DSV can be prevented from increasing.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, as a modulating system other than EFM, the present invention can be applied to EFM Plus. In the EFM Plus, a data symbol of eight bits is converted into a code symbol of 16 bits without merging bits. When the EFM Plus is used, there is a particular data pattern of which DSV increases. Thus, when an encoder having a code conversion table of which the standard code conversion table has been changed is used, the particular data pattern can prevent DSV from increasing. As a result, it can be determined whether the loaded disc is an original disc produced using the encoder according to the present invention or a copied disc produced using a conventional encoder.

The present invention can be also applied to a multi-session optical disc on which for example CD-DA formatted data and CD-ROM formatted data are recorded. As information that can be recorded to an optical disc, there are various types of data such as audio data, video data, still picture data, character data, computer graphic data, game software, and computer programs. Thus, the present invention can be applied to for example a DVD video and a DVD-ROM. In addition, the present invention can be applied to not only a disc-shaped data recording medium, but a card-shaped data recording medium.

As is clear from the foregoing description, when data is reproduced from a copied disc produced using a conventional encoder, DSV increases. As a result, a data pattern cannot be correctly reproduced. Thus, according to the present invention, a copying operation can be prevented. In addition, according to the present invention, depending on whether or not a particular data pattern can be reproduced, it can be determined whether or not the loaded medium is an original or a copy. Corresponding to the determined result, a copying operation can be prevented. According to the present invention, since a defect is not intentionally inserted onto an original medium, the present invention can be used as a format standard.

The invention claimed is:

1. A data recording medium on which digital data is recorded using a digital modulating system for converting a data symbol of a predetermined number of bits into a code symbol of a larger number of bits than the data symbol and generating record data whose run length is limited,
   wherein a data pattern that causes an absolute value of DSV to diverge to prevent data from being normally reproduced is recorded to a part of the data recording medium, and a run length limit condition is loosened if none of a plurality of data patterns causes DSV to diverge.

2. The data recording medium as set forth in claim 1,
   wherein a plurality of merging bits are disposed at a boundary of adjacent code symbols, wherein as the merging bits, there are a plurality of bit patterns,
   wherein when the data pattern is not detected, a bit pattern that satisfies the run length limit condition is selected from the plurality of bit patterns as the merging bits, and
   wherein when the data pattern is detected, in the case that the run length limit condition is loosened, the selected bit pattern is recorded as the merging bits.

3. The data recording medium as set forth in claim 2,
   wherein the data pattern is designated so that it unconditionally determines the merging bits.

4. The data recording medium as set forth in claim 2,
   wherein in the case that the run length limit condition is loosened, after the merging bits are selected, the run length limit condition is restored to an original condition, and data of which the merging bits are selected is recorded.

5. The data recording medium as set forth in claim 2,
   wherein the case that DSV of a digital modulation is detected and the detected DSV exceeds a threshold value is treated as the case that the data pattern is detected.

6. The data recording medium as set forth in claim 5,
   wherein the case that the number of times the detected DSV exceeds the predetermined threshold value reaches a predetermined number of times is treated as the case that the data pattern is detected.

7. A data recording method in which digital data is recorded using a digital modulating system for converting a data symbol of a predetermined number of bits into a code symbol of a larger number of bits than the data symbol and generating record data whose run length is limited, the data recording method comprising the steps of:
   recording a data pattern that causes an absolute value of DSV to diverge to prevent data from being normally reproduced to a part of a data recording medium, the data pattern chosen based on a run length limit condition; and
   loosening the run length limit condition if none of a plurality of data patterns causes DSV to diverge.

8. The data recording method as set forth in claim 7,
   wherein a plurality of merging bits are disposed at a boundary of adjacent code symbols, wherein as the merging bits, there are a plurality of bit patterns,
   wherein when the data pattern is not detected, a bit pattern that satisfies the run length limit condition and that causes DSV to maximally decrease is selected from the plurality of bit patterns as the merging bits, and
   wherein when the data pattern is detected, in the case that the run length limit condition is loosened, the selected bit pattern is recorded as the merging bits.

9. The data recording method as set forth in claim 8,
   wherein the data pattern is designated so that it unconditionally determines the merging bits.

10. The data recording method as set forth in claim 8,
   wherein in the case that the run length limit condition is loosened, after the merging bits are selected, the run length limit condition is restored to an original condition, and data of which the merging bits are selected is recorded.

11. The data recording method as set forth in claim 8, wherein the case that DSV of a digital modulation is detected and the detected DSV exceeds a threshold value is treated as the case that the data pattern is detected.

12. The data recording method as set forth in claim 11, wherein the case that the number of times the detected DSV exceeds the predetermined threshold value reaches a predetermined number of times is treated as the case that the data pattern is detected.

13. A data recording apparatus for recording digital data using a digital modulating system for converting a data symbol of a predetermined number of bits into a code symbol of a larger number of bits than the data symbol and generating record data whose run length is limited,
wherein the apparatus partly records a data pattern that causes an absolute value of DSV to diverge to prevent data from being normally reproduced, and
wherein the apparatus loosens a run length limit condition if none of a plurality of data patterns causes DSV to diverge.

14. The data recording apparatus as set forth in claim 13, wherein a plurality of merging bits are disposed at a boundary of adjacent code symbols, wherein as the merging bits, there are a plurality of bit patterns,
wherein when the data pattern is not detected, a bit pattern that satisfies the run length limit condition and that causes DSV to maximally decrease is selected from the plurality of bit patterns as the merging bits, and
wherein when the data pattern is detected, in the case that the run length limit condition is loosened, the selected bit pattern is recorded as the merging bits.

15. The data recording apparatus as set forth in claim 14, wherein the data pattern is designated so that it unconditionally determines the merging bits.

16. The data recording apparatus as set forth in claim 14, wherein in the case that the run length limit condition is loosened, after the merging bits are selected, the run length limit condition is restored to an original condition, and data of which the merging bits are selected is recorded.

17. The data recording apparatus as set forth in claim 14, wherein the case that DSV of a digital modulation is detected and the detected DSV exceeds a threshold value is treated as the case that the data pattern is detected.

18. The data recording apparatus as set forth in claim 17, wherein the case that the number of times the detected DSV exceeds the predetermined threshold value reaches a predetermined number of times is treated as the case that the data pattern is detected.

* * * * *